United States Patent
Zhang

(10) Patent No.: US 10,972,009 B2
(45) Date of Patent: Apr. 6, 2021

(54) MULTI-PHASE CONVERTER AND CONTROL CIRCUIT THEREOF

(71) Applicant: Chengdu Monolithic Power Systems Co., Ltd., Chengdu (CN)

(72) Inventor: Tianzhu Zhang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/695,087

(22) Filed: Nov. 25, 2019

(65) Prior Publication Data
US 2020/0169170 A1    May 28, 2020

(30) Foreign Application Priority Data
Nov. 28, 2018 (CN) .......................... 201811434550.9

(51) Int. Cl.
*H02M 3/158* (2006.01)

(52) U.S. Cl.
CPC ......... *H02M 3/1584* (2013.01); *H02M 3/158* (2013.01)

(58) Field of Classification Search
CPC .................................................. H02M 3/1584
See application file for complete search history.

(56) References Cited

U.S. PATENT DOCUMENTS

| | | | |
|---|---|---|---|
| 2011/0234193 A1* | 9/2011 | Laur | H02M 3/1584 323/311 |
| 2019/0074770 A1* | 3/2019 | Trichy | H02M 1/42 |

* cited by examiner

*Primary Examiner* — Thienvu V Tran
*Assistant Examiner* — Peter M Novak
(74) *Attorney, Agent, or Firm* — Perkins Coie LLP

(57) ABSTRACT

A COT control circuit used for realizing current sharing in multi-phase DC-DC converter. The multi-phase DC-DC converter has N switching circuits, N controllers, and a trimming current generator receiving N switching voltage signals of the N switching circuits to generate N trimming current signals. The N trimming current signals are respectively sent to the N controllers to regulate on time of at least one controllable switch of each of the N switching circuits so as to finally realize current sharing in the multi-phase circuits.

18 Claims, 7 Drawing Sheets

MULTI-PHASE CONVERTER AND CONTROL CIRCUIT THEREOF

CROSS-REFERENCE TO RELATED APPLICATION

This application claims the benefit of CN application No. 201811434550.9, filed on Nov. 28, 2018, and incorporated herein by reference.

TECHNICAL FIELD

The present invention generally refers to electrical circuit, and more particularly but not exclusively refers to control circuit and control method for a multi-phase DC-DC converter.

BACKGROUND

In power conversion applications, an interleaved multi-phase power supply is widely used in power conversion applications requiring large power and large amounts of current. The interleaved multi-phase power supply also provides small ripple and optimizes thermal and power distributions. However, due to biases of the load and element characteristics among multiple phase circuits, output current biases may thus be occurred among multiple output current signals. The output current biases may affect efficiency and stability of the whole system. For example, in a COT controlled multi-phase power supply, on time of switch of each phase may be different from each other due to biases of element characteristics. Current sharing is unable to realize in the multiple phase circuits without on time regulation.

Therefore, current sharing control is indispensable in the interleaved multi-phase power supply. It is desired to have a solution for solving the current sharing in multi-phase DC-DC converter.

SUMMARY

Embodiments of the present invention are directed to a control circuit for controlling a multi-phase DC-DC converter having N switching circuits to convert an input voltage signal to an output voltage signal, and wherein N is an integer greater than 1, and wherein each of N switching circuits comprises a controllable switch, and wherein the control circuit comprises: a comparing circuit, configured to compare a voltage feedback signal indicative of the output voltage signal with a reference signal to generate a comparing signal; a trimming current generator, having N input terminals respectively coupled to the N switching circuits to receive N switching voltage signals, wherein the trimming current generator is configured to generate N trimming current signals correspondingly based on the N switching voltage signals, and wherein for each i=1, . . . , N, the $i^{th}$ switching voltage signal of the N switching voltage signals is indicative of a voltage across the controllable switch of the $i^{th}$ switching circuit, and wherein the $i^{th}$ switching voltage signal has an $i^{th}$ voltage difference from a voltage average of the N switching voltage signals, and wherein the $i^{th}$ trimming current signal has an $i^{th}$ current difference from a current average of the N trimming current signals, and wherein for each i=1, . . . , N−1, a ratio of the $i^{th}$ current difference to the $i^{th}$ voltage difference is equal to a ratio of the $(i+1)^{th}$ current difference to the $(i+1)^{th}$ voltage difference; and N controllers, wherein for each i=1, . . . , N, the $i^{th}$ controller is configured to generate an $i^{th}$ control signal to control the controllable switch of the $i^{th}$ switching circuit based on the output voltage signal, the input voltage signal, the comparing signal and the $i^{th}$ trimming current signal, and wherein the N controllers are enabled in sequence.

Embodiments of the present invention are further directed to a multi-phase DC-DC converter, comprising: N switching circuits, coupled in parallel between an input terminal and an output of the multi-phase DC-DC converter, and configured to convert an input voltage signal to an output voltage signal, wherein each of the N switching circuits comprises a controllable switch, and wherein N is an integer larger than or equal to 2; a comparing circuit, configured to compare a voltage feedback signal indicative of the output voltage signal with a reference signal to generate a comparing signal; a trimming current generator, having N input terminals respectively coupled to N switching circuits to receive N switching voltage signals, configured to generate N trimming current signals correspondingly based on the N switching voltage signals, and wherein for each i=1, . . . , N, the $i^{th}$ switching voltage signal of the N switching voltage signals is indicative of a voltage across the controllable switch of the $i^{th}$ switching circuit, and wherein the $i^{th}$ switching voltage signal has an $i^{th}$ voltage difference from a voltage average of the N switching voltage signals, and wherein the $i^{th}$ trimming current signal has an $i^{th}$ current difference from a current average of the N trimming current signals, and wherein for each i=1, . . . , N−1, a ratio of the $i^{th}$ current difference to the $i^{th}$ voltage difference is equal to a ratio of the $(i+1)^{th}$ current difference to the $(i+1)^{th}$ voltage difference; and N controllers, wherein for each i=1, . . . , N, the $i^{th}$ controller is configured to generate an $i^{th}$ control signal to control the controllable switch of the $i^{th}$ switching circuit based on the output voltage signal, the input voltage signal, the comparing signal and the $i^{th}$ trimming current signal, and wherein the N controllers are enabled in sequence.

Embodiments of the present invention are further directed to a current sharing method used for a multi-phase DC-DC converter having N switching circuits to convert an input voltage signal to an output voltage signal, and wherein N is an integer greater than 1, and wherein each of the N switching circuits comprises a controllable switch, and wherein the current sharing method comprises: sensing voltage across the controllable switch of each of the N switching circuits to respectively generate N switching voltage signals; generating N trimming current signals correspondingly based on the N switching voltage signals, wherein for each i=1, . . . , N, the $i^{th}$ switching voltage signal has an $i^{th}$ voltage difference from a voltage average of the N switching voltage signals, and wherein the $i^{th}$ trimming current signal has an $i^{th}$ current difference from a current average of the N trimming current signals, and wherein for each i=1, . . . , N−1, a ratio of the $i^{th}$ current difference to the $i^{th}$ voltage difference is equal to a ratio of the $(i+1)^{th}$ current difference to the $(i+1)^{th}$ voltage difference; and regulating on time of the controllable switch of the $i^{th}$ switching circuit based on the $i^{th}$ trimming current signal.

BRIEF DESCRIPTION OF THE DRAWINGS

Non-limiting and non-exhaustive embodiments are described with reference to the following drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The phrase "couple" includes direct connection and indirect connection. Indirect connection includes connection through conductor which has resistance and/or parasitic parameters such as inductance and capacitance, or connection through diode, and so on.

Figure 1:
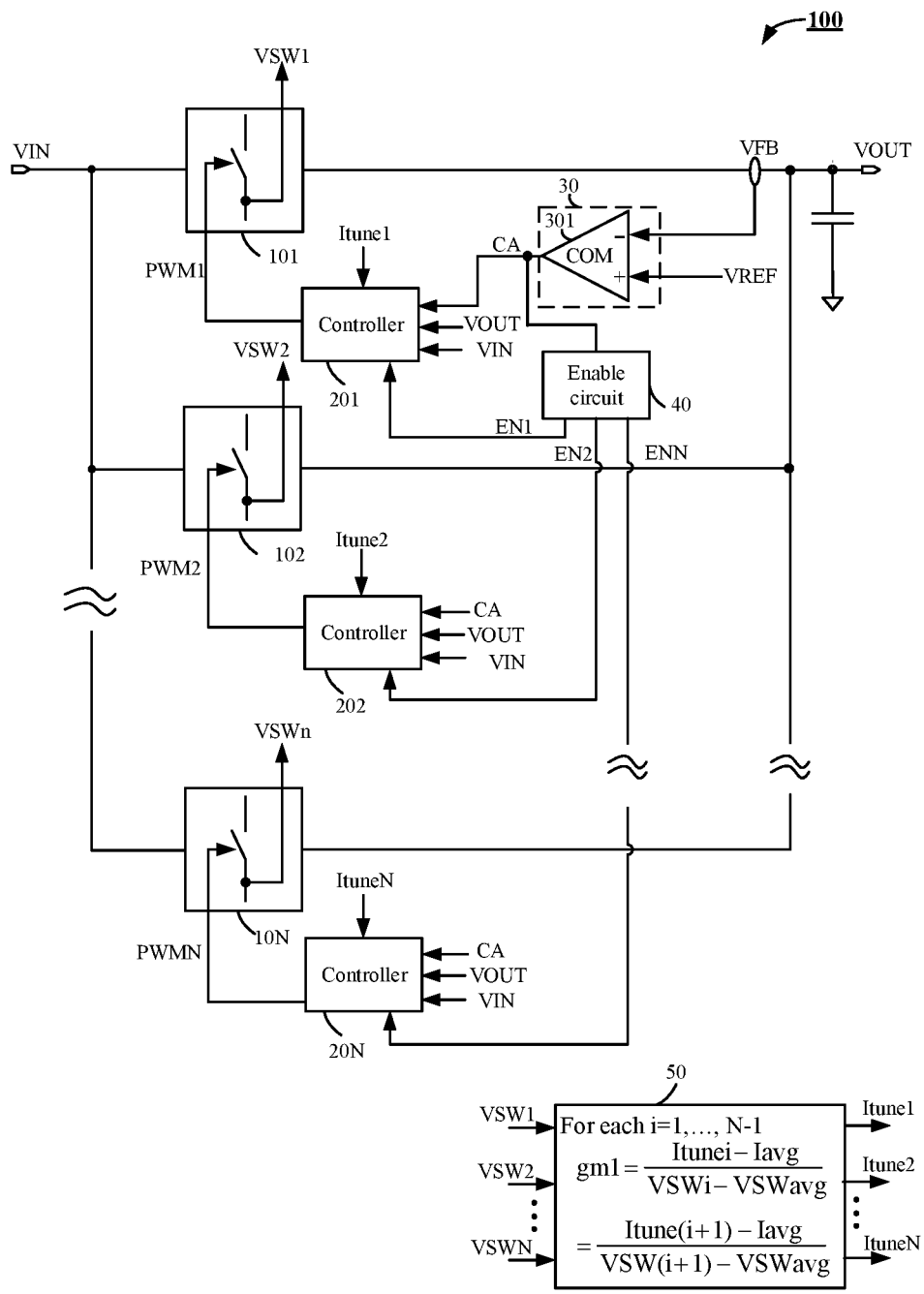
FIG. 1 schematically illustrates a multi-phase DC-DC converter 100 in accordance with an embodiment of the present invention.

FIG. 1 schematically illustrates a multi-phase DC-DC converter 100 in accordance with an embodiment of the present invention. As shown in FIG. 1, the multi-phase DC-DC converter 100 may comprise an input terminal, an output terminal, N switching circuits (101, 102, . . . , 10N) and a control circuit, wherein N is an integer greater than 1. The N switching circuits (101, 102, . . . , 10N) may be coupled in parallel between an input terminal and an output terminal of the multi-phase DC-DC converter 100. The input terminals of the N switching circuits (101, 102, . . . , 10N) are coupled together to receive the input voltage signal VIN. The output terminal of the N switching circuits (101, 102, . . . , 10N) are coupled together to provide an output voltage signal VOUT. In the exemplary embodiment of FIG. 1, the control circuit of the multi-phase DC-DC converter 100 may comprise N controller (201, 202, . . . , 20N), a comparing circuit 30, an enable circuit 40 and a trimming current generator 50. Each of the N switching circuits (101, 102, . . . , 10N) is controlled by the corresponding controller. For example, the first switching circuit 101 is controlled by the first controller 201, the second switching circuit 102 is controlled by the second controller 202, and the $N^{th}$ switching circuit 10N is controlled by the $N^{th}$ controller 20N, and so forth. Each of the N switching circuits (101, 102, . . . , 10N) may comprise at least one controllable switch. The input voltage signal VIN may be converted to the output voltage signals VOUT by switching the at least one controllable switch of each of the N switching circuits (101, 102, . . . , 10N) on and off.

In the exemplary embodiment of FIG. 1, the comparing circuit 30 may have a first input terminal configured to receive a voltage feedback signal VFB indicative of the output voltage signal VOUT, a second input terminal configured to receive a reference signal VREF, and an output terminal. The comparing circuit 30 may be configured to compare the voltage feedback signal VFB with the reference signal VREF to generate a comparing signal CA at its output terminal. The comparing signal CA may be a logic signal having a logic high state and a logic low state. In an embodiment, the comparing signal CA is active (e.g., the logic high state) when the voltage feedback signal VFB is smaller than the reference signal VREF, and the comparing signal CA is inactive (e.g., the logic low state) when the voltage feedback signal VFB is larger than the reference signal VREF. In an embodiment, the comparing circuit 30 may comprise a voltage comparator 301 having a non-inverting terminal, an inverting terminal and an output terminal, wherein the non-inverting terminal of the voltage comparator 301 is operated as the first input terminal of the comparing circuit 30, and the inverting terminal of the voltage comparator 301 is operated as the second input terminal of the comparing circuit 30. When the voltage feedback signal VFB is smaller than the reference signal VREF, the comparing signal CA is activated to turn on the controllable switch.

In the exemplary embodiment of FIG. 1, the enable circuit 40 may be configured to receive the comparing signal, and further configured to generate N enable signals (EN1, EN2, . . . , ENN). Each of N enable signals (EN1, EN2, . . . , ENN) is configured to enable a corresponding controller, and only one of the N controllers (201, 202, . . . , 20N) is enabled in each switching cycle. For example, in a 3-phase DC-DC converter application, the first controller 201 is enabled by the first enable signal EN1 in the first switching cycle while the second controller 202 and the third controller 203 are disabled by the second enable signal EN2 and the third enable signal EN3 respectively; the second controller 202 is enabled by the second enable signal EN2 in the second switching cycle while the first controller 201 and the third controller 203 are disabled by the first enable signal EN1 and the third enable signal EN3 respectively; and the third controller 203 is enabled by the third enable signal EN3 in the third switching cycle while the first controller 201 and the second controller 202 are disabled by the first enable signal EN1 and the second enable signal EN2 respectively.

Due to the biases of element characteristics among the N controllers (201, 202, . . . , 20N), the output current signals of each of the N switching circuits (101, 102, . . . , 10N) may not be the same. The biases among the output current signals of each of the N switching circuits (101, 102, . . . , 10N) may increase the ripple current of the output current of the multi-phase DC-DC converter 100. Therefore, the control circuit may further comprise the trimming current generator 50 configured to regulate the output current signal of each of the N switching circuits (101, 102, ..., 10N) to equalize to each other.

In the exemplary embodiment of FIG. 1, the trimming current generator 50 may comprise N input terminals respectively coupled to the N switching circuits (101, 102, ..., 10N) to receive N switching voltage signals (VSW1, VSW2, ..., VSWN). In an embodiment, the $N^{th}$ switching voltage signal VSWN may be indicative of the voltage across the controllable switch of the $N^{th}$ switching circuit 10N. For example, when the controllable switch is illustrated as a metal oxide semiconductor field effect transistor (MOSFET), the switching voltage signal may be the source-drain voltage VDS of the MOSFET. In an embodiment, the $N^{th}$ switching voltage signal VSWN may be representative of the voltage on a common node of two controllable switches of the $N^{th}$ switching circuit 10N. For example, in a switching circuit having a BUCK topology, the $N^{th}$ switching voltage signal VSWN of the controllable switch of the $N^{th}$ switching circuit 10N may be the voltage signal on the common connection of a high side switch and a low side switch. The trimming current generator 50 may be further configured to generate N trimming current signals (Itune1, Itune2, ..., ItuneN) based on the N switching voltage signals (VSW1, VSW2, ..., VSWN).

In an embodiment, assuming average of the N switching voltage signals (VSW1, VSW2, ..., VSWN) is labeled as VSWavg, average of the N trimming current signals (Itune1, Itune2, ..., ItuneN) is labeled as Iavg, each of the N switching voltage signals (VSW1, VSW2, ..., VSWN) and the average VSWavg of the N switching voltage signals (VSW1, VSW2, ..., VSWN) has a switching voltage difference VSW_DN, each of the N trimming current signals (Itune1, Itune2, ..., ItuneN) and the average Iavg of the N trimming current signals (Itune1, Itune2, ..., ItuneN) has a current difference IDN, for each i=1, ..., N−1, a ratio labeled as gm1 of the $i^{th}$ current difference to the $i^{th}$ switching voltage difference is equal to the ratio of the $(i+1)^{th}$ current difference to the $(i+1)^{th}$ voltage difference. The equations can be shown as follow:

$$VSWavg = \frac{VSW1 + VSW2 + ... + VSWN}{N} \quad (1)$$

$$Iavg = \frac{Itune1 + Itune2 + ... + ItuneN}{N} \quad (2)$$

$$gm1 = \frac{IDN}{VSW\_DN} = \quad (3)$$

$$\frac{Itune1 - Iavg}{VSW1 - VSWavg} = \frac{Itune2 - Iavg}{VSW2 - VSWavg} = ... = \frac{ItuneN - Iavg}{VSWN - VSWavg}$$

In an embodiment, the ratio gm1 is relative to the parameters of the trimming current generator 50. In an embodiment, the ratio gm1 is a positive value, i.e., each of the N trimming current signals (Itune1, Itune2, ..., ItuneN) is increased with increase of the corresponding one switching voltage signal. In another embodiment, the ratio gm1 is a negative value, i.e., each of the N trimming current signals (Itune1, Itune2, ..., ItuneN) is decreased with increase of the corresponding one switching voltage signal. In an embodiment, sum of N the trimming current signals (Itune1, Itune2, ..., ItuneN) is a fixed value and is invariable in each switching cycle. In another embodiment, sum of the N trimming current signals (Itune1, Itune2, ItuneN) is proportional to the input voltage signal VIN or the output voltage signal VOUT. When the input voltage signal VIN or the output voltage signal VOUT is unchanged, i.e., the system operates at a steady state, sum of the N trimming current signals (Itune1, Itune2, ..., ItuneN) is invariable in each switching cycle.

In an exemplary application with BUCK switching circuit comprising a high side switch and a low side switch, when the $N^{th}$ switching voltage signal VSWN is larger than the average VSWavg, the trimming current generator 50 may increase the $N^{th}$ trimming current signals ItuneN to reduce on time of the high side switch (assuming the controllable switch is the high side switch) of the $N^{th}$ switching circuit 10N so as to decease the $N^{th}$ switching voltage signal VSWN until the $N^{th}$ switching voltage signal VSWN is equal to the average VSWavg. When the $N^{th}$ switching voltage signal VSWN is smaller than the average VSWavg, the trimming current generator 50 may decrease the $N^{th}$ trimming current signals ItuneN to increase on time of the high side switch (assuming the controllable switch is the high side switch) of the $N^{th}$ switching circuit 10N so as to increase the $N^{th}$ switching voltage signal VSWN until the $N^{th}$ switching voltage signal VSWN is equal to the average VSWavg.

In the exemplary embodiment of FIG. 1, the N controllers (201, 202, ..., 20N) may be operated in sequence, and only one of the N controllers (201, 202, ..., 20N) is enabled in a switching cycle. Each of the N controllers (201, 202, ..., 20N) may be configured to receive the output voltage signal VOUT, the input voltage signal VIN, the comparing signal CA, the $N^{th}$ enable signal ENN and the $N^{th}$ trimming current signal ItuneN. When the $N^{th}$ enable signal ENN is active, the $N^{th}$ controller 20N may be configured to generate a $N^{th}$ control signal PWMN in compliance with the output voltage signal VOUT, the input voltage signal VIN, the comparing signal CA and the $N^{th}$ trimming current signal ItuneN to control the controllable switch of the $N^{th}$ switching circuit 10N.

For example, the first controller 201 may be configured to receive the output voltage signal VOUT, the input voltage signal VIN, the comparing signal CA, the first enable signal EN1 and the first trimming current signal Itune1. When the first enable signal EN1 is active, the first controller 201 may be configured to generate a first control signal PWM1 in compliance with the output voltage signal VOUT, the input voltage signal VIN, the comparing signal CA and the first trimming current signal Itune1 to control the controllable switch of the first switching circuits 101.

The second controller 202 may be configured to receive the output voltage signal VOUT, the input voltage signal VIN, the comparing signal CA, the second enable signal EN2 and the second trimming current signal Itune2. When the second enable signal EN2 is active, the second controller 202 may be configured to generate a second control signal PWM2 in compliance with the output voltage signal VOUT, the input voltage signal VIN, the comparing signal CA and the second trimming current signal Itune2 to control the controllable switch of the second switching circuits 102.

Similarly, the controller 20N may be configured to receive the output voltage signal VOUT, the input voltage signal VIN, the comparing signal CA, the $N^{th}$ enable signal ENN and the $N^{th}$ trimming current signal ItuneN. When the $N^{th}$ enable signal ENN is active, the second controller 20N may be configured to generate a $N^{th}$ control signal PWMN in compliance with the output voltage signal VOUT, the input voltage signal VIN, comparing signal CA and the $N^{th}$ trimming current signal ItuneN to control the controllable switch of the $N^{th}$ switching circuits 10N, and so forth.

In the exemplary embodiment of FIG. 1, N switching circuits (101, 102, . . . , 10N) could be illustrated to have the BUCK topology, a BOOST topology, a BUCK-BOOST topology or other suitable topologies. In an embodiment, all of N switching circuits (101, 102, . . . , 10N) are illustrated to have the same topology, e.g., the BUCK topology. In an exemplary embodiment, such as the BUCK application where the controllable switch may comprise the high side switch and the low side switch, the $N^{th}$ control signal PWMN may comprise a high side control signal (e.g., a high side control signal HSN of FIG. 4 will be described later) and a low side control signal (e.g., a low side control signal LSN of FIG. 4 to be described later) to respectively control the high side switch and the low side switch.

Figure 2:
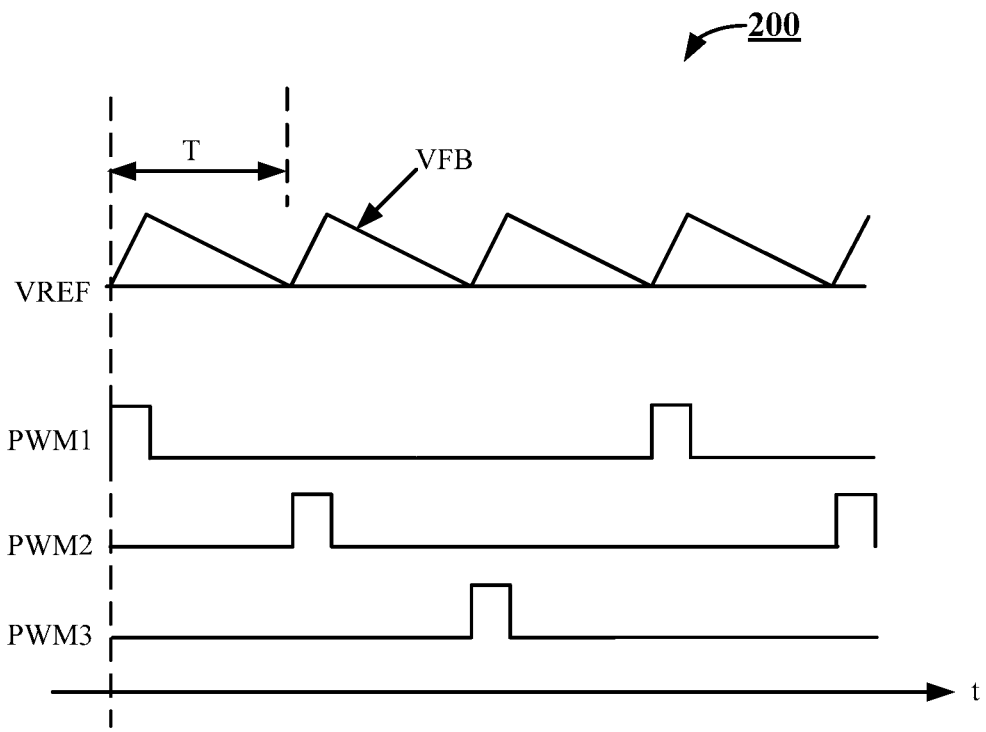
FIG. 2 illustrates an operation waveform diagram 200 illustrating operation of a 3-phase DC-DC converter in accordance with an embodiment of the present invention.

FIG. 2 illustrates an operation waveform diagram 200 illustrating operation of a 3-phase DC-DC converter in accordance with an embodiment of the present invention. As shown in FIG. 2, the diagram 200 illustrates the feedback signal VFB, the reference signal VREF, the first control signal PWM1, the second control signal PWM2 and a third control signal PWM3 from top-to-bottom. FIG. 2 is also illustrated that only one switching circuit is operated in a switching cycle T and the on time of the three phases is the same even biases of the elements characteristics among multiple phase circuits are existed.

Figure 3:
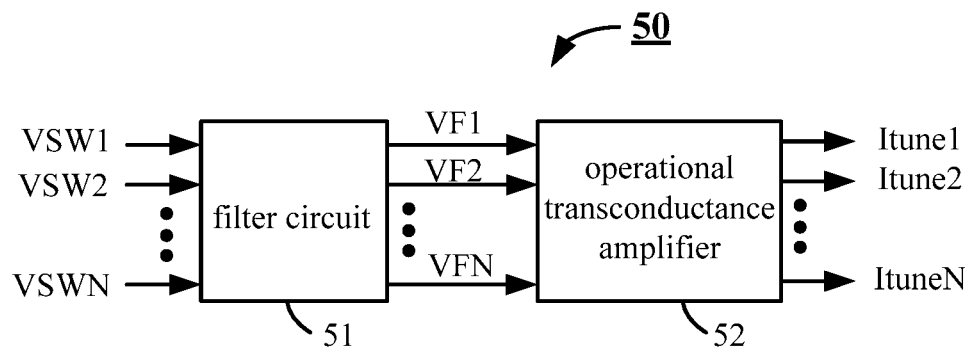
FIG. 3 schematically illustrates the trimming current generator 50 in accordance with an embodiment of the present invention.

FIG. 3 schematically illustrates the trimming current generator 50 in accordance with an embodiment of the present invention. As shown in FIG. 3, the trimming current generator 50 may comprise a filter circuit 51 and an operational transconductance amplifier (OTA) 52. In an embodiment, the filter circuit 51 may be configured to receive N switching voltage signals (VSW1, VSW2, . . . , VSWN) and further configured to filter N switching voltage signals (VSW1, VSW2, . . . , VSWN) to generate N average voltage signals (VF1, VF2, . . . , VFN), wherein each of the N average voltage signals (VF1, VF2, . . . , VFN) is indicative of an average of the corresponding switching voltage signal. The OTA 52 may be configured to receive the N average voltage signals (VF1, VF2, . . . , VFN) and further configured to generate the N trimming current signals (Itune1, Itune2, . . . , ItuneN) based on the N average voltage signals (VF1, VF2, . . . , VFN). As mentioned above, assuming average of the N average voltage signals (VF1, VF2, . . . , VFN) is labeled as VFavg, each of the N average voltage signals (VF1, VF2, . . . , VFN) and the average VFavg has an average voltage difference VF_DN. For each i=1, . . . , N−1, a ratio labeled as gm2 of the $i^{th}$ current difference to the $i^{th}$ average voltage difference is equal to the ratio of the $(i+1)^{th}$ current difference to the $(i+1)^{th}$ voltage difference, and can be shown as below:

$$gm2 = \frac{IDN}{\text{VF\_DN}} = \frac{Itune1 - Iavg}{VF1 - VFavg} = \frac{Itune2 - Iavg}{VF2 - VFavg} = \ldots = \frac{ItuneN - Iavg}{VFN - VFavg} \qquad (4)$$

In an embodiment, the ratio gm2 is relative to the transconductance and other parameters of OTA 52.

Figure 4:
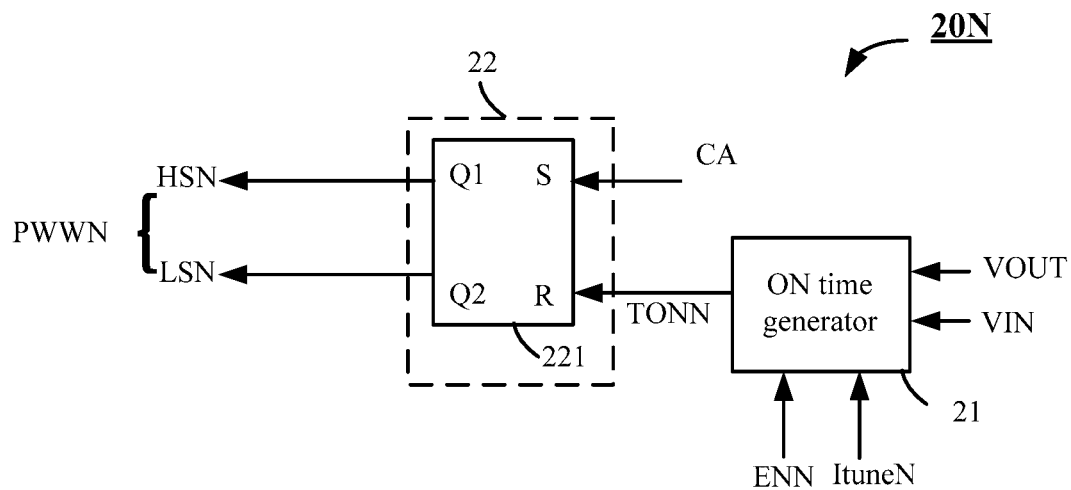
FIG. 4 schematically illustrates a controller 20N in accordance with an embodiment of the present invention.

FIG. 4 schematically illustrates a controller 20N in accordance with an embodiment of the present invention. As shown in FIG. 4, the controller 20N may comprise an ON time generator 21 and a logic circuit 22.

In the exemplary embodiment of FIG. 4, the ON time generator 21 may be configured to receive the input voltage signal VIN, the output voltage signal VOUT, the $N^{th}$ enable signal ENN and the $N^{th}$ trimming current signal ItuneN to generate a $N^{th}$ on time signal TONN. The $N^{th}$ on time signal TONN may comprise a logic signal with a logic high state and a logic low state. In an embodiment, when the $N^{th}$ on time signal TONN is changed from the logic low state to the logic high state, the controllable switch of the $N^{th}$ switching circuit 10N is turned off.

The logic circuit 22 may be configured to receive the comparing signal CA and the $N^{th}$ on time signal TONN, and configured to conduct a logic operation to the comparing signal CA and the $N^{th}$ on time signal TONN to generate the $N^{th}$ control signal PWMN. In an embodiment, the logic circuit 22 may be illustrated as a RS flip-flop 221. The RS flip-flop 221 may comprise a set terminal S configured to receive the comparing signal CA, a reset terminal R configured to receive the $N^{th}$ on time signal TONN, a first output terminal Q1 and a second output terminal Q2. In an embodiment, the $N^{th}$ control signal PWMN may comprise the high-side control signal HSN configured to control the high-side switch of the $N^{th}$ switching circuit 10N and the low-side control signal LSN configured to control the low-side switch of the $N^{th}$ switching circuit 10N. The RS flip-flop 221 may be configured to conduct a logic operation to the comparing signal CA and the $N^{th}$ on time signal TONN to generate the high-side control signal HSN at the first output terminal Q1 and the low-side control signal LSN at the second output terminal Q2.

While in the exemplary embodiment of FIG. 4, the $N^{th}$ enable signal ENN is illustrated to enable the ON time generator 21, it should be understood that the $N^{th}$ enable signal ENN is not intended to limit to this embodiment. And in the other embodiments, the $N^{th}$ enable signal ENN is also can be adopted to enable the controller 20N via controlling the logic circuit 22.

Figure 5:
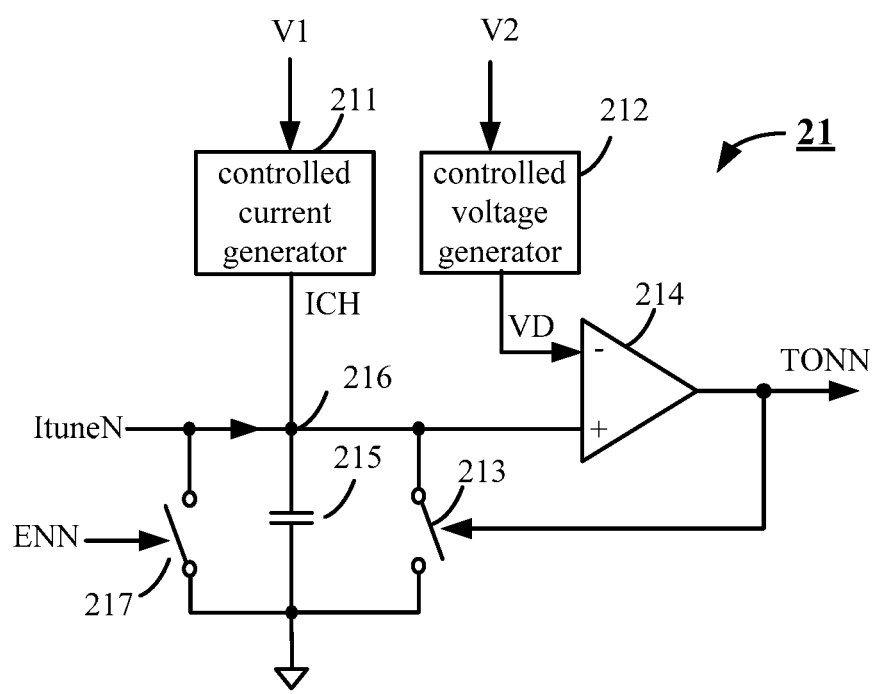
FIG. 5 schematically illustrates the ON time generator 21 of FIG. 5 in accordance with an embodiment of the present invention.

FIG. 5 schematically illustrates the ON time generator 21 of FIG. 5 in accordance with an embodiment of the present invention. In the exemplary embodiment of FIG. 5, the ON time generator 21 may comprise a controlled current generator 211, a controlled voltage generator 212, and a reset switch 213, a charge comparator 214, a capacitor 215 and a node 216. The controlled current generator 211 may be configured to receive a first voltage signal V1 to generate a controlled current signal ICH on the node 216. The capacitor 215 may be connected between the node 216 and a logic ground. The $N^{th}$ output terminals of the trimming current generator 50 may be coupled to node 216 to provide the corresponding trimming current signal ItuneN. In an embodiment, the trimming current signal ItuneN may be varied in the change of controlled current signal ICH. In an embodiment, sum of the N trimming current signals (Itune1, Itune2, . . . , ItuneN) is proportional to the value of the controlled current signal ICH. The sum of the N trimming current signals (Itune1, Itune2, . . . , ItuneN) is constant in each switching cycle when the controlled current signal is invariable. For example, sum of the N trimming current signals (Itune1, Itune2, . . . , ItuneN) is equal to 0.2 of the controlled current signal ICH. The reset switch 213 may have a first terminal coupled to node 216, a second terminal connected to logic ground, and a control terminal. The controlled voltage generator 212 may be configured to receive a second voltage signal V2 to generate a controlled voltage signal VD. The charge comparator 214 may have a first input terminal configured to receive the controlled voltage signal VD, a second input terminal coupled to node 216 to receive the voltage on the node 216, and an output terminal. The charge comparator 214 may be configured to compare the controlled voltage signal VD and the voltage on the node 216 to generate the $N^{th}$ on time signal TONN. The reset switch 213 may have a first terminal coupled to the node 216, a second terminal connected to the logic ground, and a control terminal coupled to the output terminal of the charge comparator 214 to receive the $N^{th}$ on time signal TONN. When the $N^{th}$ on time signal TONN control the reset switch 213 on, the capacitor 215 is discharged via the reset switch 213. When the $N^{th}$ on time signal TONN control the reset switch 213 off, the controlled current signal ICH and the $N^{th}$ trimming current signal ItuneN simultaneously charge the capacitor 215. Once voltage on the node 216 is increased to the controlled voltage signal VD, the state of the $N^{th}$ on time signal TONN is changed from the low state to the high state so as to turn the reset switch 213 on again. Therefore, the conduct time t1 of the controllable switch of the $N^{th}$ switching circuit 10N can be calculated by the below equation:

$$t1 = \frac{VD \times C}{ICH + ItuneN} \quad (5)$$

Wherein C is indicative of capacitance of the capacitor 215.

In the exemplary embodiment of FIG. 5, the first voltage signal V1 and the second voltage signal V2 may be chosen in compliance with topology of the $N^{th}$ switching circuits 10N. In an embodiment, when the switching circuit 10N is illustrated to have a BUCK topology, the on time of the controllable switch (assuming the controllable switch is the high side switch of the BUCK switching circuit) is proportional to the output voltage signal VOUT, and inversely proportional to the input voltage signal VIN. Therefore, the first voltage signal V1 may comprise the input voltage signal VIN so that the controlled current signal ICH is proportional to the input voltage signal VIN. And the second voltage signal V2 may comprise the output voltage signal VOUT so that the controlled voltage signal VD is proportional to the output voltage signal VOUT. In an embodiment, when the $N^{th}$ switching voltage signal VSWN is larger than the average VSWavg, the trimming current generator 50 may increase the $N^{th}$ trimming current signals ItuneN to reduce charge time of capacitor 215 so as to decrease on time of the controllable switch of the $N^{th}$ switching circuit 10N. The one of ordinary skill in the art can be understood, when the $N^{th}$ switching voltage signal VSWN is larger than the average of the N switching voltage signals (VSW1, VSW2, . . . , VSWN), the trimming current generator 50 can also decrease the $N^{th}$ trimming current signals ItuneN to increase charge time of capacitor 215 so as to increase on time of the controllable switch (assuming the controllable switch is the low side switch of the BUCK switching circuit). When the $N^{th}$ switching voltage signal VSWN is smaller than average of N switching voltage signals (VSW1, VSW2, . . . , VSWN), the trimming current generator 50 may decrease the $N^{th}$ trimming current signals ItuneN to increase charge time of capacitor 215 so as to increase on time of the controllable switch (assuming the controllable switch is the high side switch of the BUCK switching circuit) of the $N^{th}$ switching circuit 10N.

In another embodiment where the $N^{th}$ switching circuit 10N is illustrated to have a BOOST topology, the on time of the controllable switch (assuming the controllable switch is the low side switch of the BOOST switching circuit) is proportional to the difference of the output voltage signal VOUT and the input voltage signal VIN, i.e., VOUT-VIN, and inversely proportional to the output voltage signal VOUT. Therefore, the first voltage signal V1 may comprise the output voltage signal VOUT so that the controlled current signal ICH is proportional to the output voltage signal VOUT. And the second voltage signal V2 may comprise the input voltage signal VIN and the output voltage signal VOUT so that the controlled voltage signal VD is proportional to the difference of the output voltage signal VOUT and the input voltage signal VIN, i.e., VOUT-VIN. In such an application, when the $N^{th}$ switching voltage signal VSWN is larger than the average of N switching voltage signals, the trimming current generator 50 may increase the $N^{th}$ trimming current signals ItuneN to reduce charge time of capacitor 215 so as to decrease on time of the controllable switch of the $N^{th}$ switching circuit 10N. In another embodiment, the trimming current generator 50 can also decrease the $N^{th}$ trimming current signals ItuneN to increase charge time of capacitor 215 so as to increase on time of the controllable switch (assuming the controllable switch is the high side switch of the BOOST switching circuit). When the $N^{th}$ switching voltage signal VSWN is smaller than average of N switching voltage signals (VSW1, VSW2, . . . , VSWN), the trimming current generator 50 may decrease the $N^{th}$ trimming current signals ItuneN to increase charge time of capacitor 215 so as to increase on time of the controllable switch (assuming the controllable switch is the low side switch of the BOOST switching circuit) of the corresponding switching circuit 10N.

In the exemplary embodiment of FIG. 5, the ON time generator 21 may further comprise an enable switch 217 having a first terminal coupled to node 216, a second terminal connected to the logic ground, and a control terminal configured to receive the $N^{th}$ enable signal ENN. In an embodiment, when the $N^{th}$ enable signal ENN is active, the enable switch 217 is turned off so as to enable the ON time generator 21. In another embodiment, the $N^{th}$ enable signal ENN is also can be adopted to enable the ON time generator 21 via other suitable ways, for example, the $N^{th}$ enable signal ENN could be adopted to control the charge comparator 214 to enable the ON time generator 21.

Figure 6:
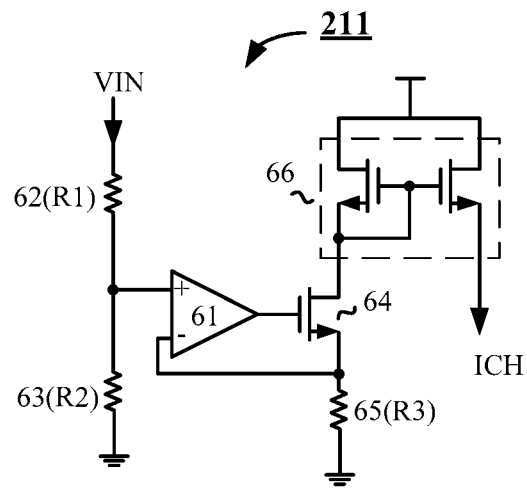
FIG. 6 schematically illustrates the controlled current generator 211 of FIG. 5 in accordance with an embodiment of the present invention.

FIG. 6 schematically illustrates the controlled current generator 211 of FIG. 5 in accordance with an embodiment of the present invention. In the exemplary embodiment of FIG. 6, the schematic diagram of the controlled current generator 211 is illustrated based on the BUCK topology that the switching circuit 10N is illustrated to have. In the exemplary embodiment of FIG. 6, the controlled current generator 211 may comprise an operational amplifier 61 having a first input terminal, a second input terminal and an output terminal, wherein the first input terminal is configured to receive the input voltage VIN through a resistor 62 with resistance R1, and coupled to the logic ground through a resistor 63 with resistance R2, and the second input terminal is coupled to the output terminal through a transistor 64, and coupled to the logic ground through a resistor 65 with resistance R3; and a pull-up current mirror 66 having a current-in end and a current-out end, wherein the current-in end is coupled to the transistor 64, and the current-out end is configured to provide the controlled current signal ICH. Thus, the controlled current signal ICH in FIG. 6 has a relationship with the input voltage VIN as follow:

$$ICH = \frac{VIN \times R2}{(R1 + R2) \times R3} \quad (6)$$

Figure 7:
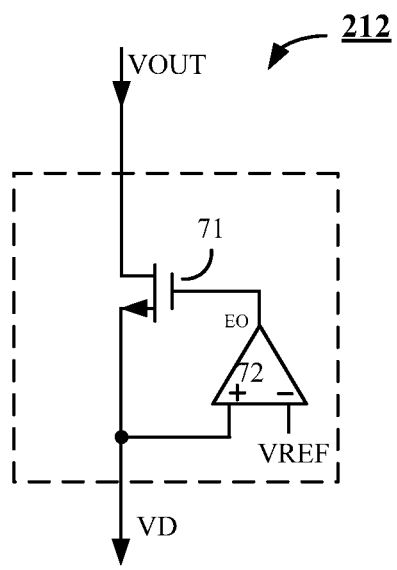
FIG. 7 schematically illustrates the controlled voltage generator 212 of FIG. 5 in accordance with an embodiment of the present invention.

FIG. 7 schematically illustrates the controlled voltage generator 212 of FIG. 5 in accordance with an embodiment of the present invention. In the exemplary embodiment of FIG. 7, the schematic diagram of the controlled voltage generator 212 is illustrated based on the BUCK switching circuit. In the exemplary embodiment of FIG. 7, the controlled current generator 211 may comprise a low dropout regulator (LDO). The LDO may comprise a transistor 71 and an error amplifier 72. The transistor 71 may have a first terminal configured to receive the output voltage signal VOUT, a second terminal configured to provide the controlled voltage signal VD. The error amplifier 72 may have a first input terminal configured to receive the reference signal VREF, a second input terminal coupled to the second terminal of the transistor 71, and an output terminal coupled to the output terminal of the transistor 71. The error amplifier 72 may be configured to amplify the error of the controlled voltage signal VD and the reference signal VREF, and further configured to provide an error signal EO at the output terminal to control the transistor 71 operating in its linear areas.

Whereas the embodiments of FIGS. 6-7 only describe the controlled voltage generator 212 and the controlled current generator 211 based on BUCK switching circuit, the controlled voltage generator 212 and the controlled current generator 211 based on BOOST switching circuit can be easily obtained through easy amendments. For the sake of simplicity, it will not be described again.

Figure 8:
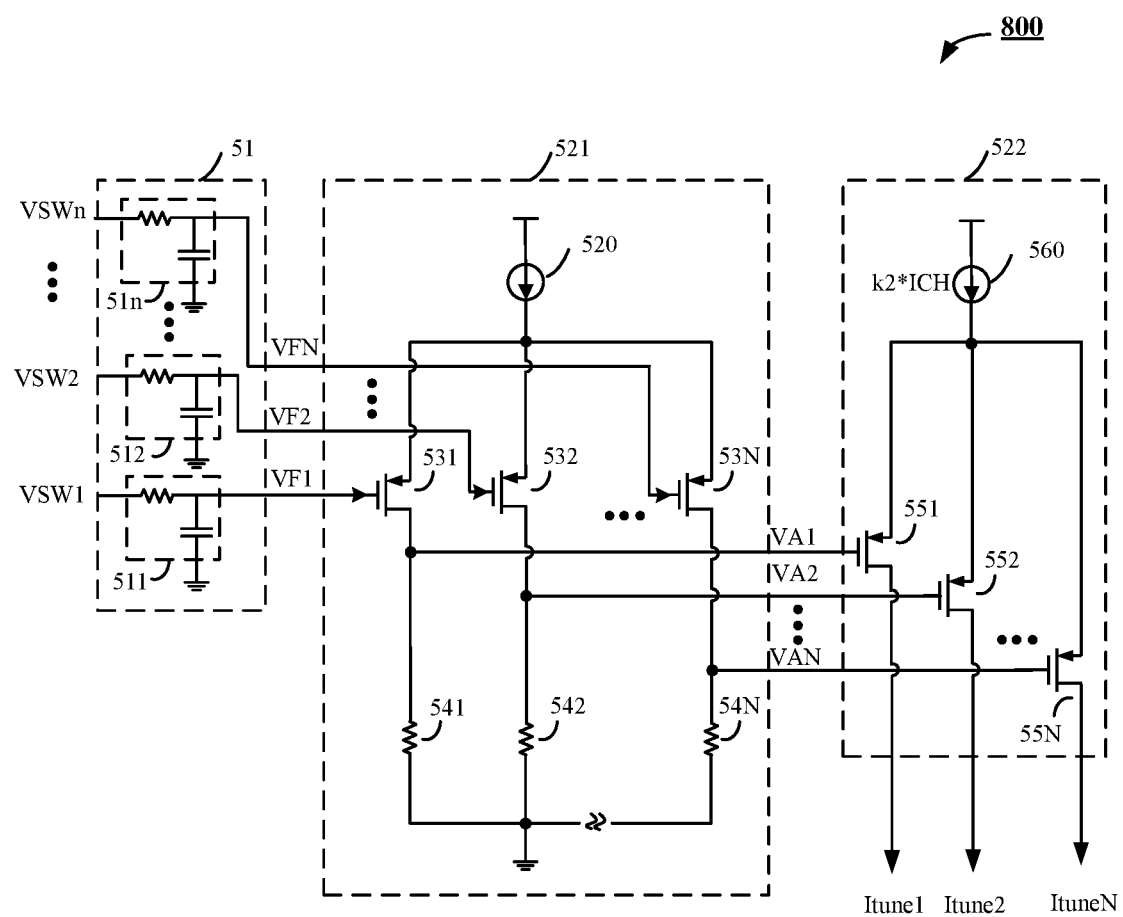
FIG. 8 schematically illustrates a trimming current generator 800 in accordance with an embodiment of the present invention.

FIG. 8 schematically illustrates a trimming current generator 800 in accordance with an embodiment of the present invention. The schematic diagram of the trimming current generator 800 is illustrated based on the BUCK switching circuit. As shown in FIG. 8, the trimming current generator 800 may comprise the filter circuit 51 and the OTA 52.

In an embodiment, the filter circuit 51 may comprise N filter module (511, 512, . . . , 51N) each of which includes a filter resistor and a filter capacitor configured to respectively receive the corresponding switching voltage signal, and further configured to filter the N switching voltage signals (VSW1, VSW2, . . . , VSWN) to generate N average voltage signals (VF1, VF2, . . . , VFN) at its N output terminals.

In an embodiment, the OTA 52 may comprise an amplifying circuit 521 and an transconductance circuit 522. In the exemplary embodiment of FIG. 8, the amplifying circuit 521 may have N input terminals configured to receive the N average voltage signals (VF1, VF2, . . . , VFN), and N output terminals configured to provide N amplifying voltage signals (VA1, VA2, . . . , VAN). The amplifying circuit 521 may comprise a current reference source 520, N P-type MOSFETs (531, 532, . . . , 53N) operating in linear area and N amplifying resistors (541, 542, . . . , 54N) having the same resistance. The sources of N P-type MOSFETs are together coupled to the current reference source 520; the drains of each of the N P-type MOSFETs are connected to the logic ground through the corresponding amplifying resistor; and the gate of each N P-type MOSFET is configured to receive the corresponding average voltage signal. A common connection of drain of each N P-type MOSFET and the corresponding amplifying resistor as one of N output terminals of amplifying circuit 521 is configured to provide one of the N amplifying voltage signals VAN, and wherein voltage of each common connection is operated as one of N amplifying voltage signal. Each of N amplifying voltage signals is proportional to the corresponding average voltage signal, and the proportionality coefficient of the $N^{th}$ amplifying voltage signals VAN and the $N^{th}$ average voltage signal is labeled as k1, i.e., VAN=k1×VFN. In an embodiment, the proportionality coefficient k1 is changed through regulating value of current reference source 520 and resistances of N amplifying resistors.

In the exemplary embodiment of FIG. 8, the transconductance circuit 522 may have N input terminals configured to receive N amplifying voltage signals, and N output terminals configured to provide N trimming current signals. The transconductance circuit 522 may comprise a current source 560, N P-type MOSFETs (551, 552, . . . , 55N) operating in linear area. The sources of N P-type MOSFETs (551, 552, . . . , 55N) are together coupled to the current source 560; the gate of each N P-type MOSFET (551, 552, . . . , 55N) is configured to receive the corresponding amplifying voltage signal, and the drain of each N P-type MOSFET (551, 552, . . . , 55N) as one of N output terminals of transconductance circuit 522 is configured to provide one of the N trimming current signals. In an embodiment, sum of the N trimming current signals (Itune1, Itune2, . . . , ItuneN) is equal to the value of a current source 560 and is invariable in each switching cycle. In an embodiment, value of current source 560 is proportional to the controlled current signal ICH with a proportionality coefficient k2, i.e., value of current source 560 is equal to value of k2×ICH. That is, when the controlled current signal ICH keeps invariant (i.e., the input voltage signal VIN or the output voltage signal VOUT is constant), the sum of the N trimming current signals (Itune1, Itune2, . . . , ItuneN) is unchanged.

As set forth above, in the exemplary trimming current generator 800, the ratio gm1 is a positive value, i.e., each of the N trimming current signals (Itune1, Itune2, . . . , ItuneN) is increased with increase of the corresponding one switching voltage signal. However, one of ordinary skill in the art could be understood in compliance with instructions of this application that each of the N trimming current signals (Itune1, Itune2, . . . , ItuneN) can be decreased with increase of the corresponding one switching voltage signal. The related schematic circuit of trimming current generator 50 having a negative ratio gm1 can be easily obtained through simple amendments. For the sake of simplicity, it will not be described here.

Figure 9:
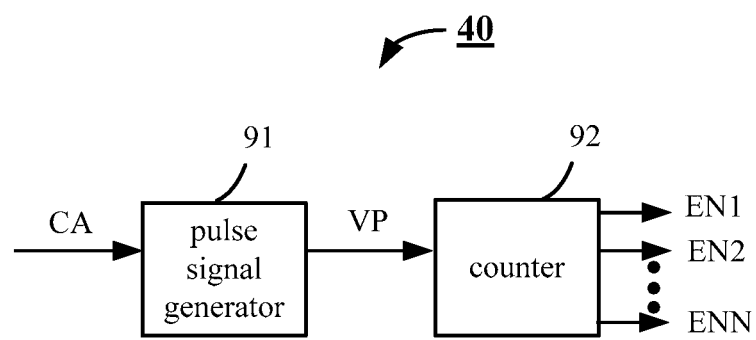
FIG. 9 schematically illustrates the enable circuit 40 in accordance with an embodiment of the present invention.

FIG. 9 schematically illustrates the enable circuit 40 in accordance with an embodiment of the present invention. The enable circuit 40 may comprise a pulse signal generator 91 and a counter 92. The pulse signal generator 91 is configured to receive the comparing signal CA and further configured to generate a pulse signal VP having a pulse at each rising edge of the comparing signal CA. The counter 92 may be configured to receive the pulse signal VP, and further configured to count the pluses of the pulses signal PA to do a modulo operation of count value so as to generate the N enable signals. For example, in a 3-phase DC-DC converter application, 3 modulo operation of count value is needed. For example, when the result of 3 modulo operation of count value is equal to 1, the first enable signal EN1 is active (e.g. a logic high state); when the result of 3 modulo operation of count value is equal to 2, the second enable signal EN2 is active (e.g. a logic high state); when the result of 3 modulo operation of count value is equal to 0, the third enable signal EN3 is active (e.g. a logic high state).

Figure 10:
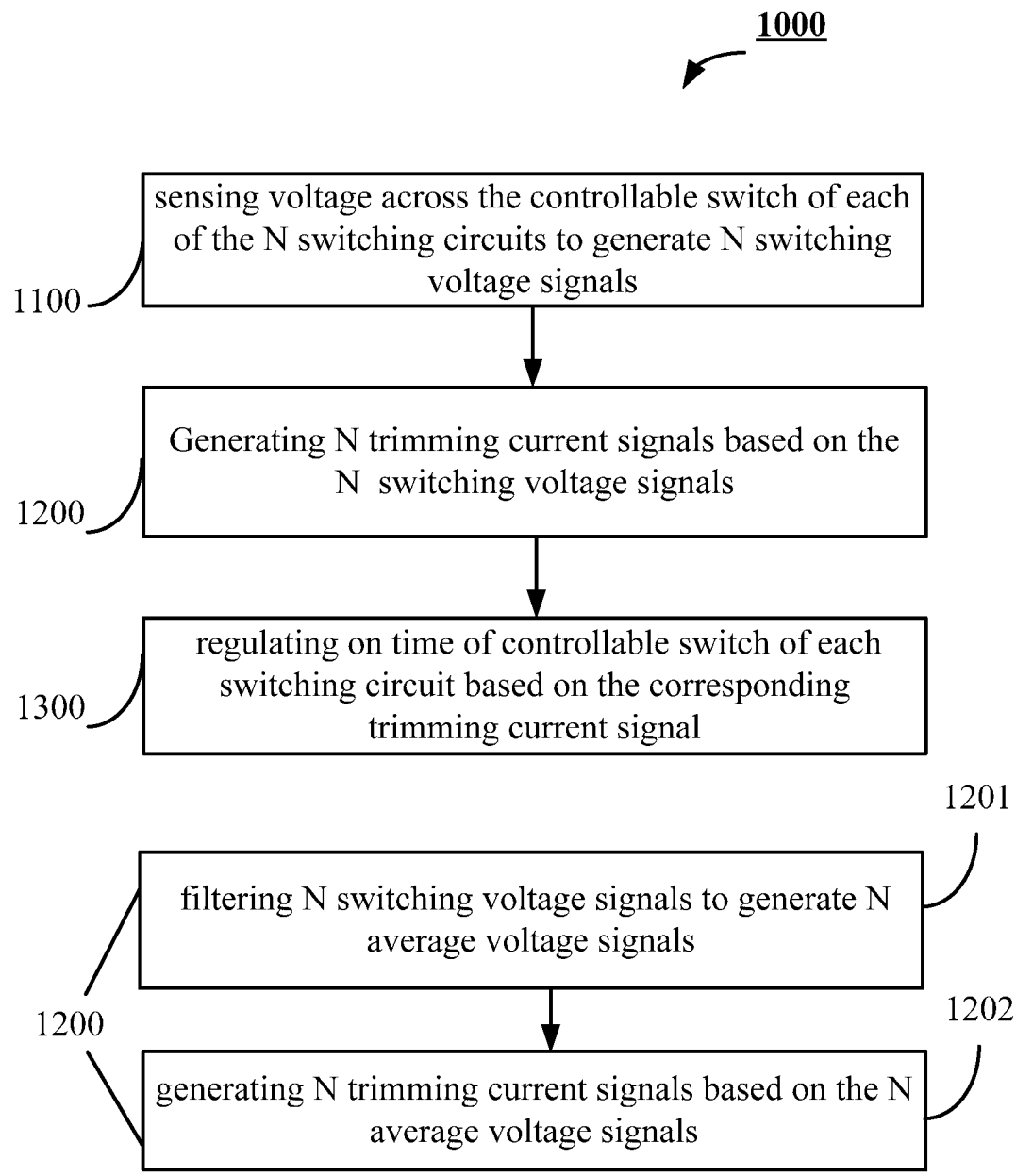
FIG. 10 illustrates a current sharing method 1000 for a multi-phase DC-DC converter in accordance with an embodiment of the present invention.

FIG. 10 illustrates a current sharing method 1000 for a multi-phase DC-DC converter in accordance with an embodiment of the present invention. As mentioned above, the multi-phase DC-DC converter comprises N switching circuits (101, 102, . . . , 10N) coupled in parallel between an input terminal and an output terminal of the multi-phase DC-DC converter to convert an input voltage signal VIN to an output voltage signal VOUT, and wherein N is an integer greater than 1. Each of the N switching circuits (101, 102, ..., 10N) may comprise at least one controllable switch. The current sharing method 1000 can be adopted in the multi-phase DC-DC converter 100 of FIG. 1. The current sharing method 1000 may comprise steps 1100-1300.

In step 1100, sensing voltage across the controllable switch of each of the N switching circuits (101, 102, ..., 10N) to respectively generate N switching voltage signals (VSW1, VSW2, ..., VSWN). In an embodiment, each switching voltage signal may be indicative of voltage across the controllable switch of the corresponding switching circuit. In another embodiment, the switching voltage signal may be representative of voltage on a common connection of two controllable switches of the corresponding switching circuit. For example, in a switching circuit having a BUCK topology, the switching voltage signal may be the voltage on common connection of a high side switch and a low side switch.

In step 1200, generating N trimming current signals (Itune1, Itune2, ... ItuneN) based on the N switching voltage signals (VSW1, VSW2, ..., VSWN). Each of the N switching voltage signals (VSW1, VSW2, ..., VSWN) and the average of the N switching voltage signals (VSW1, VSW2, ..., VSWN) has a switching voltage difference VSW_DN, each of the N trimming current signals (Itune1, Itune2, ..., ItuneN) and the average of the N trimming current signals (Itune1, Itune2, ..., ItuneN) has a current difference IDN. for each i=1, ..., N−1, a ratio labeled as gm1 of the $i^{th}$ current difference to the $i^{th}$ switching voltage difference is equal to the ratio of the $(i+1)^{th}$ current difference to the $(i+1)^{th}$ voltage difference.

In an embodiment, the step of generating N trimming current signals (Itune1, Itune2, ..., ItuneN) based on the N switching voltage signals (VSW1, VSW2, ..., VSWN) may further comprise steps 1201 and 1202. In step 1201, filtering N switching voltage signals to generate N average voltage signals (VF1, VF2, ..., VFN) respectively. In step 1202, generating N trimming current signals (Itune1, Itune2, ..., ItuneN) based on the N average voltage signals (VF1, VF2, ..., VFN). Each of the N average voltage signals (VF1, VF2, ..., VFN) and the average of the N average voltage signals (VF1, VF2, ..., VFN) has an average voltage difference. For each i=1, ..., N−1, a ratio labeled as gm2 of the $i^{th}$ current difference to the $i^{th}$ average voltage difference is equal to the ratio of the $(i+1)^{th}$ current difference to the $(i+1)^{th}$ voltage difference. In an embodiment, sum of the N trimming current signals (Itune1, Itune2, ..., ItuneN) is a fixed value and is invariable in each switching cycle. In another embodiment, sum of the N trimming current signals (Itune1, Itune2, ..., ItuneN) is proportional to the input voltage signal VIN or the output voltage signal VOUT. When the input voltage signal VIN or the output voltage signal VOUT is unchanged, i.e., the system operates at a steady state, sum of the N trimming current signals (Itune1, Itune2, ..., ItuneN) is invariable in each switching cycle.

In step 1300, regulating on time of controllable switch of each of the N switching circuits (101, 102, ..., 10N) based on the corresponding trimming current signal.

Obviously many modifications and variations of the present invention are possible in light of the above teachings. It is should be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What I claim is:

1. A control circuit for controlling a multi-phase DC-DC converter having N switching circuits to convert an input voltage signal to an output voltage signal, and wherein N is an integer greater than 1, and wherein each of the N switching circuits comprises a controllable switch, and wherein the control circuit comprises:
   a comparing circuit, configured to compare a voltage feedback signal indicative of the output voltage signal with a reference signal to generate a comparing signal;
   a trimming current generator, having N input terminals respectively coupled to the N switching circuits to receive N switching voltage signals, wherein the trimming current generator is configured to generate N trimming current signals correspondingly based on the N switching voltage signals, and wherein for each i from 1 to N, the $i^{th}$ switching voltage signal of the N switching voltage signals is indicative of a voltage across the controllable switch of the $i^{th}$ switching circuit, and wherein the $i^{th}$ switching voltage signal has an $i^{th}$ voltage difference from a voltage average of the N switching voltage signals, and wherein the $i^{th}$ trimming current signal has an $i^{th}$ current difference from a current average of the N trimming current signals, and wherein for each i from 1 to N−1, a ratio of the $i^{th}$ current difference to the $i^{th}$ voltage difference is equal to a ratio of the $(i+1)^{th}$ current difference to the $(i+1)^{th}$ voltage difference; and
   N controllers, wherein for each i from 1 to N, the $i^{th}$ controller is configured to generate an $i^{th}$ control signal to control the controllable switch of the $i^{th}$ switching circuit based on the output voltage signal, the input voltage signal, the comparing signal and the $i^{th}$ trimming current signal, and wherein the N controllers are enabled in sequence.

2. The control circuit of claim 1, wherein for each i from 1 to N, the $i^{th}$ trimming current signal is increased with increase of the $i^{th}$ switching voltage signal.

3. The control circuit of claim 1, wherein for each i from 1 to N, the $i^{th}$ trimming current signal is decreased with increase of the $i^{th}$ switching voltage signal.

4. The control circuit of claim 1, wherein sum of the N trimming current signals is a fixed value and is invariable in each switching cycle.

5. The control circuit of claim 1, wherein the trimming current generator comprises:
   a filter circuit, configured to receive the N switching voltage signals and further configured to filter the N switching voltage signals to generate N average voltage signals; and
   an operational transconductance amplifying circuit, configured to respectively receive the N average voltage signals to generate the N trimming current signals, for each i from 1 to N, the $i^{th}$ average voltage signal has an $i^{th}$ average voltage difference from a voltage average of the N average voltage signals, and wherein for each i from 1 to N−1, a ratio of the $i^{th}$ average voltage difference to the $i^{th}$ current difference is equal to a ratio of the $(i+1)^{th}$ average voltage difference to the $(i+1)^{th}$ current difference.

6. The control circuit of claim 5, wherein the operational transconductance amplifying circuit comprises:
an amplifying circuit, having N input terminals configured to receive the N average voltage signals and N output terminals, wherein the amplifying circuit is configured to amplify the N average voltage signals to generate N amplifying voltage signals at the N output terminals of the amplifying circuit; and
a transconductance circuit, configured to receive the N amplifying voltage signals to generate the N trimming current signals.

7. The control circuit of claim 1, wherein the control circuit further comprises:
an enable circuit, configured to receive the comparing signal, and further configured to generate N enable signals based on the comparing signal, wherein only one of the N enable signals is active in a switching cycle, and wherein
for each i from 1 to N, the $i^{th}$ controller is configured to receive the output voltage signal, the input voltage signal, the comparing signal, the $i^{th}$ trimming current signal and the $i^{th}$ enable signal, when the $i^{th}$ enable signal is active, the $i^{th}$ controller is configured to generate the $i^{th}$ control signal based on the output voltage signal, the input voltage signal, the comparing signal and the $i^{th}$ trimming current signal.

8. The control circuit of claim 7, wherein for each i from 1 to N, the $i^{th}$ controller comprises:
an ON time generator, configured to receive the input voltage signal, the output voltage signal, the $i^{th}$ enable signal and the $i^{th}$ trimming current signal, and further configured to generate an $i^{th}$ on time signal based on the input voltage signal, the output voltage signal, the $i^{th}$ enable signal and the $i^{th}$ trimming current signal; and
a logic circuit, configured to receive the comparing signal and the $i^{th}$ on time signal, and further configured to conduct a logic operation to the comparing signal and the $i^{th}$ on time signal to generate the $i^{th}$ control signal.

9. The control circuit of claim 8, wherein the ON time generator comprises:
a first node, coupled to the trimming current generator to receive the $i^{th}$ trimming current signal;
a controlled current generator, having a first terminal configured to receive a first voltage signal and a second terminal coupled to the first node, configured to generate a controlled current signal based on the first voltage signal;
a capacitor, connected between the first node and a logic ground;
a controlled voltage generator, having a first terminal configured to receive a second voltage signal and a second terminal, configured to generate a controlled voltage signal at its second terminal based on the second voltage signal;
a charge comparator, having a first input terminal configured to receive the controlled voltage signal, a second input terminal coupled to the first node to receive a voltage on the first node, and an output terminal, wherein the charge comparator is configured to compare the controlled voltage signal with the voltage on the first node to generate the $i^{th}$ on time signal; and
a reset switch, having a first terminal coupled to the first node, a second terminal connected to the logic ground, and a control terminal coupled to the output terminal of the charge comparator to receive the $i^{th}$ on time signal.

10. The control circuit of claim 9, wherein sum of the N trimming current signals is proportional to the value of the controlled current signal, and wherein the sum of the N trimming current signals is constant in each switching cycle when the controlled current signal is invariable.

11. A multi-phase DC-DC converter, comprising:
N switching circuits, configured to convert an input voltage signal to an output voltage signal, wherein each of the N switching circuits comprises a controllable switch, and wherein N is an integer greater than 1;
a comparing circuit, configured to compare a voltage feedback signal indicative of the output voltage signal with a reference signal to generate a comparing signal;
a trimming current generator, having N input terminals respectively coupled to N switching circuits to receive N switching voltage signals, configured to generate N trimming current signals correspondingly based on the N switching voltage signals, and wherein for each i from 1 to N, the $i^{th}$ switching voltage signal of the N switching voltage signals is indicative of a voltage across the controllable switch of the $i^{th}$ switching circuit, and wherein the $i^{th}$ switching voltage signal has an $i^{th}$ voltage difference from a voltage average of the N switching voltage signals, and wherein the $i^{th}$ trimming current signal has an $i^{th}$ current difference from a current average of the N trimming current signals, and wherein for i from 1 to N−1, a ratio of the $i^{th}$ current difference to the $i^{th}$ voltage difference is equal to a ratio of the $(i+1)^{th}$ current difference to the $(i+1)^{th}$ voltage difference; and
N controllers, wherein for each i from 1 to N, the $i^{th}$ controller is configured to generate an $i^{th}$ control signal to control the controllable switch of the $i^{th}$ switching circuit based on the output voltage signal, the input voltage signal, the comparing signal and the $i^{th}$ trimming current signal, and wherein the N controllers are enabled in sequence.

12. The multi-phase DC-DC converter of claim 11, wherein sum of the N trimming current signals is a fixed value and is invariable in each switching cycle.

13. The multi-phase DC-DC converter of claim 11, wherein for each i from 1 to N, the ratio of the $i^{th}$ current difference to the $i^{th}$ voltage difference is a positive value.

14. The multi-phase DC-DC converter of claim 11, wherein for each i from 1 to N, the ratio of the $i^{th}$ current difference to the $i^{th}$ voltage difference is a negative value.

15. A current sharing method used for a multi-phase DC-DC converter having N switching circuits to convert an input voltage signal to an output voltage signal, and wherein N is an integer greater than 1, and wherein each of the N switching circuits comprises a controllable switch, and wherein the current sharing method comprises:
sensing voltage across the controllable switch of each of the N switching circuits to respectively generate N switching voltage signals;
generating N trimming current signals correspondingly based on the N switching voltage signals, wherein for each i from 1 to N, the $i^{th}$ switching voltage signal has an $i^{th}$ voltage difference from a voltage average of the N switching voltage signals, and wherein the $i^{th}$ trimming current signal has an $i^{th}$ current difference from a current average of the N trimming current signals, and wherein for each i from 1 to N−1, a ratio of the $i^{th}$ current difference to the $i^{th}$ voltage difference is equal to a ratio of the $(i+1)^{th}$ current difference to the $(i+1)^{th}$ voltage difference; and regulating on time of the controllable switch of the $i^{th}$ switching circuit based on the $i^{th}$ trimming current signal.

16. The current sharing method of claim 15, wherein the step of generating N trimming current signals correspondingly based on the N switching voltage signals comprises:

filtering the N switching voltage signals to generate N average voltage signals respectively; and generating the N trimming current signals correspondingly based on the N average voltage signals, wherein for each i from 1 to N, the $i^{th}$ average voltage signal has an $i^{th}$ average voltage difference from a voltage average of the N average voltage signals, and wherein for each i from 1 to N−1, a ratio of the $i^{th}$ average voltage difference to the $i^{th}$ current difference is equal to a ratio of the $(i+1)^{th}$ average voltage difference to the $(i+1)^{th}$ current difference.

17. The current sharing method of claim 15, wherein sum of the N trimming current signals is a fixed value and is invariable in each switching cycle.

18. The current sharing method of claim 15, wherein sum of the N trimming current signals is proportional to the input voltage signal or the output voltage signal.

* * * * *